(12) United States Patent
Davis et al.

(10) Patent No.: US 6,295,558 B1
(45) Date of Patent: Sep. 25, 2001

(54) AUTOMATIC STATUS POLLING FAILOVER OR DEVICES IN A DISTRIBUTED NETWORK MANAGEMENT HIERARCHY

(75) Inventors: Wallace Clayton Davis; Darren D. Smith; Eric A. Pulsipher, all of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/137,851

(22) Filed: Aug. 21, 1998

(51) Int. Cl.[7] .................................................. G06F 15/173
(52) U.S. Cl. ............................................................ 709/224
(58) Field of Search ..................................... 709/224, 223, 709/202; 714/48; 370/242

(56) References Cited

U.S. PATENT DOCUMENTS

| | | | |
|---|---|---|---|
| 5,650,940 | * | 7/1997 | Tonozuka et al. ............... 364/514 C |
| 5,696,486 | * | 12/1997 | Poliquin et al. ..................... 340/506 |
| 5,729,472 | * | 3/1998 | Seiffert et al. ....................... 364/550 |
| 5,781,703 | * | 7/1998 | Desai et al. ............................. 395/54 |
| 5,796,633 | * | 8/1998 | Burgess et al. ................. 364/555.01 |
| 5,964,831 | * | 10/1999 | Kearns et al. ....................... 703/201 |
| 6,085,243 | * | 7/2000 | Fletcher et al. ..................... 709/224 |
| 6,085,244 | * | 7/2000 | Wookey ............................... 709/224 |

* cited by examiner

Primary Examiner—Dung C. Dinh
Assistant Examiner—Kenneth W. Fields

(57) ABSTRACT

Automatic failover methodology provides a mechanism whereby a central control unit, such as a management station, will automatically takeover interface status polling of objects of a collection station that is temporarily unreachable. This methodology is applicable to any distributed computing environment, such as a data communications network, in which it is desirable to have a central control unit assume the interface status polling operation of a temporarily inaccessible collection station. The collection station may be inaccessible due to the network on which the central control unit and the collection station reside being down or due to the collection station being down for maintenance.

15 Claims, 3 Drawing Sheets

BEFORE FAILOVER

AFTER FAILOVER

BEFORE FAILOVER
FIG. 1A

AFTER FAILOVER
FIG. 1B

AUTOMATIC STATUS POLLING FAILOVER OR DEVICES IN A DISTRIBUTED NETWORK MANAGEMENT HIERARCHY

CROSS REFERENCES TO RELATED APPLICATIONS

The subject matter of the present application is related to U.S. application Ser. No. 08/705,358, titled "Distributed Internet Monitoring System and Method", filed Aug. 29, 1996; U.S. application Ser. No. 08/947,219, titled "Network Management Event Correlation in Environments Containing Inoperative Network Elements", filed Oct. 8, 1997; and U.S. application Ser. No. 08/551,499, titled "Filtering System and Method for High Performance Network Management MAP, filed Nov. 1, 1995, all of which are assigned to the assignee hereof and are herein incorporated by reference.

FIELD OF THE INVENTION

The present invention relates generally to data communications networks and, more particularly, to a system and a method for automatic status polling failover of devices in a distributed data communications network.

BACKGROUND OF THE INVENTION

A data communications network generally includes a group of devices, or objects, such as computers, repeaters, bridges, routers, etc., situated at network nodes and a collection of communication channels or interfaces for interconnecting the various nodes. Hardware and software associated with the network and the object devices on the network permit the devices to exchange data electronically via the communication channels.

The size of a data communications network can vary greatly. A local area network, or LAN, is a network of devices in close proximity, typically less than a mile, that are usually connected by a single cable, such as a coaxial cable. A wide area network (WAN) is a network of devices separated by longer distances and often connected by telephone lines or satellite links, for example. Some WANs span the United States, as well as the world. Furthermore, many of these networks are widely available for use by the public, including universities and commercial industries.

A very popular industry standard protocol for data communication in networks is the Internet Protocol (IP). This protocol was originally developed by the U.S. Department of Defense, and has been dedicated to public use by the U.S. government. In time, the Transmission Control Protocol (TCP) and the Unreliable Datagram Protocol (UDP) were developed for use with the IP. The TCP/IP protocol is a protocol that implements certain check functionality and thus guarantees transfer of data without errors. The UDP/IP protocol does not guarantee transfer of data but it offers the advantage of requiring much less overhead than does the TCP/IP protocol. Moreover, in order to keep track of and manage the various devices situated on a network, the Simple Network Management Protocol (SNMP) was eventually developed for use with the UDP/IP platform. The use of these protocols has become extensive in the industry, and numerous vendors now manufacture many types of network devices capable of operating with these protocols.

Network Management Systems, such as OpenView Network Node Manager (NNM) by Hewlett-Packard Company of Palo Alto, Calif. are designed to discover network topology (i.e., a list of all network devices or objects in a domain, their type, and their connections), monitor the health of each network object, and report problems to the network administration (NA). NNM contains a monitor program called netmon that monitors the network; NNM is capable of supporting a single netmon program in the case of a non-distributed network management environment and multiple netmon programs in the case of a distributed network management environment. In the distributed network management environment, a plurality of netmon processes run on various Collection Station hosts, each of which communicates topology and status information to a centralized control unit, called a Management Station, that presents information to the NA. The management station is configured to discover the network topology and from that, construct a network management map comprised of various submaps typically arranged in a hierarchical fashion. Each submap provides a different view of the network and can be viewed on a display device.

The monitor function of a Network Management System is usually performed by a computer program that periodically polls each network object and gathers data that is indicative of the object's health. Thus, each collection station is responsible for polling of objects assigned to it while the management station is assigned to poll objects assigned to it. Based upon the results of the poll, a status value will be determined. For example, a system that fails to respond would be marked as "critical." netmon performs the status polling function.

It is important to the proper operation of the network that the failure of any network object be known as soon as possible. The failure of a single network object can result in thousands of nodes and interfaces suddenly becoming inaccessible. Such a failure must be detected and remedied as soon as possible. Since collection stations are responsible for detecting the failure of their network objects through status polling, when a collection station itself goes down alternate arrangements must be made to ensure that status polling of the failed objects is maintained.

When a collection station has been downgraded from a normal status to a critical status due to an inability to communicate with the collection station, the objects normally polled by the critical collection station must continue to be polled. One way to ensure that a collection station's object are properly polled on a periodic basis is to build in redundancy to the network management system. A set of objects are thus polled by the management station as well as by the collection station. This practice of redundancy, however, while operating to ensure polling of objects has the disadvantage of increasing overhead costs of the network. Having a set of objects polled by both its collection station and the management station is, of course, inefficient for the vast majority of time during which such redundant polling is not necessary. There is therefore an unmet need in the art to be able to ensure that objects of a collection station will be status polled in a non-redundant manner in the event that the collection station is downgraded from a normal to a critical status.

SUMMARY OF THE INVENTION

It is therefore an object of the present invention to ensure that objects of a collection station will be status polled in a non-redundant manner in the event that the collection station is downgraded to a critical status.

Therefore, according to the present invention, an automatic failover methodology is provided in which a central control unit will automatically takeover status polling for a collection station that is or becomes temporarily unreachable. The automatic failover feature of the present invention is accomplished by a network monitor program that resides on the central control unit. The network monitor program operates to quickly take over status polling for network objects that are managed by a collection station that has been downgraded to a critical status. When the collection station has returned to normal status, the network monitor program will stop status polling objects for to the collection station and the collection station will again resume status polling of the objects. The present invention is applicable to any distributed computing environment, such as a data communications network, in which it is desirable to have a central control unit assume the interface status polling operation of a temporarily inaccessible collection station.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The automatic failover methodology of the present invention provides a mechanism whereby a central control unit, such as a management station, will automatically takeover interface status polling for a collection station that is temporarily unreachable. The present invention is applicable to any distributed computing environment, such as a data communications network, in which it is desirable to have a central control unit assume the interface status polling operation of a temporarily inaccessible collection station. The collection station may be inaccessible due to the network on which the central control unit and the collection station reside being down or the collection station being down for maintenance.

The automatic failover feature of the present invention is accomplished by a network monitor program, called netmon, that resides on the central control unit. Netmon operates to quickly take over status polling for network interfaces managed by a collection station that has been downgraded to a critical status. When the collection station has returned to normal status, netmon will stop status polling interfaces for the collection station.

Upon a collection station becoming temporarily unreachable, Netmon on the central control unit receives a list of network nodes managed by the collection station, which can be restricted by a failover filter. The default action is to supply netmon with the full loaded topology for the collection station that has gone down, thereby allowing the central control unit to take over entirely for the critical collection station. Duplicate objects shared by both the central control unit and the collection station will only be polled once from the central control unit. If, however, multiple collection stations are polling the nodes and one of the collection stations is downgraded to critical status, then both the central control unit and the remaining operational collection stations will poll the node. The central control unit performs this duplicate polling for the critical collection station because it is desirable to maintain the polling configuration defined by the user.

Figure 1A:
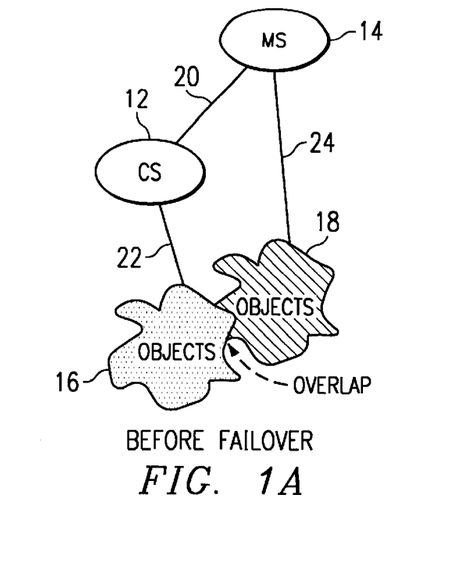
FIG. 1a illustrates a network topology of a distributed computing environment before the failover mechanism of the present invention has occurred.

Referring to FIG. 1a, an example of a network topology before the failover mechanism of the present invention has occurred is shown. In this representation, it can be seen that the collection station CS 12 polls a collection of objects 16 through communication interface 22 while central control unit, shown here as management station MS 14, polls a collection of objects 18 through communication interface 24. As shown in the figure, in this example there is some commonality, or overlap, between collection of objects 16 and 18; the present invention operates regardless of the existence of such an overlap. Collection station CS 12 and MS 14 communicate with each other over communication interface 20, as shown.

Figure 1B:
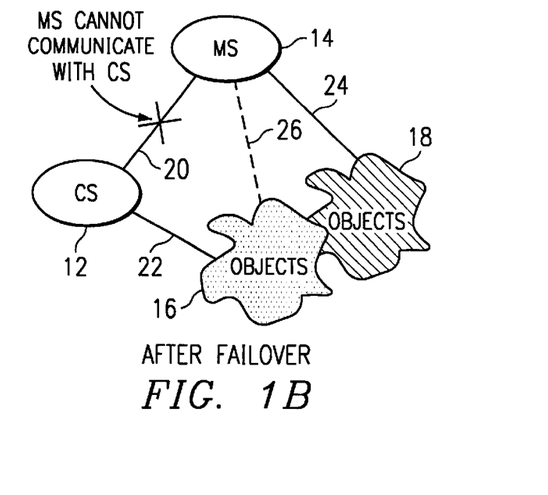
FIG. 1b illustrates a collection station that has become unreachable and therefore downgraded from a normal to critical status.

Referring now to FIG. 1b, the collection station CS 12 has become unreachable for some reason and therefore been downgraded from normal status to critical status; this critical status is indicated by the "X" through communication interface 20. After CS 12 has become unreachable, then MS 14 takes over status polling for the collection station objects 16. Where there is an overlap between collection station objects 16 and management station objects 18, MS 14 will only poll a duplicate object one time. As previously discussed, if any duplicate objects are also polled by other collection station (s), not shown here, MS 14 as well as the other collection station(s) will both poll the duplicate object or node. This duplication of polling serves to maintain the polling configuration defined by the user.

Figure 2:
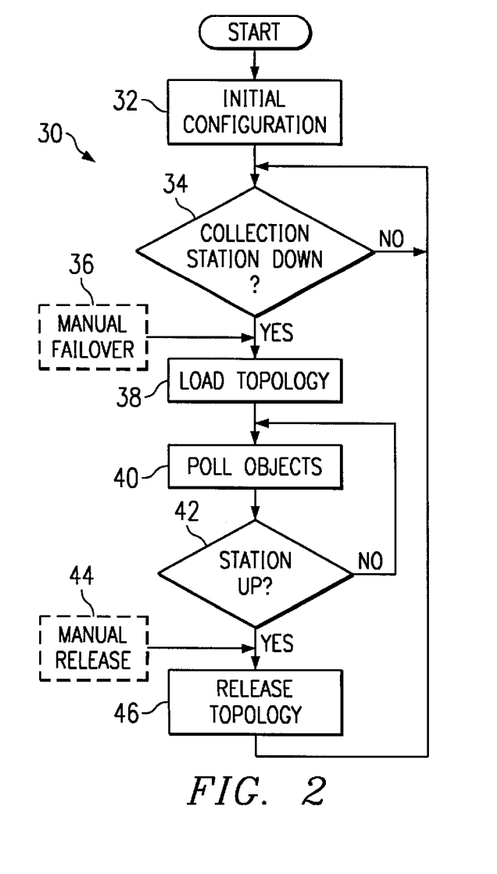
FIG. 2 illustrates an overview of the methodology of the present invention.

An overview of the methodology of the present invention is presented in FIG. 2. First, as shown in Block 32, the initial configuration of the central control unit and one or more collection stations of the distributed computing environment is defined. During the initial configuration, the user specifies the polling configuration of the central control unit and the collection station(s). At Decision Block 34, the inquiry is whether a collection station of the distributed computing environment is not reachable by the central control unit. It is noted that since there may be a multitude of collection stations in the network, the network monitor program netmon will monitor each collection station in this manner. Thus, the flow 30 of FIG. 2 is performed for each collection station monitored by netmon.

If the collection station at issue is reachable by the central control unit, then netmon continues to monitor the collection station as indicated in the figure. If, however, the collection station has become unreachable, then a manual, or user initiated, failover of the collection station polling to the central control unit may be performed. As indicated by the dashed box of Block 36, the manual failover, as well as the manual release of Block 44, are optional. Normally, the manual failover and manual release of Blocks 36 and 44 would be not be performed in favor of the automatic failover described by Blocks 34 and 42.

Figure 3:
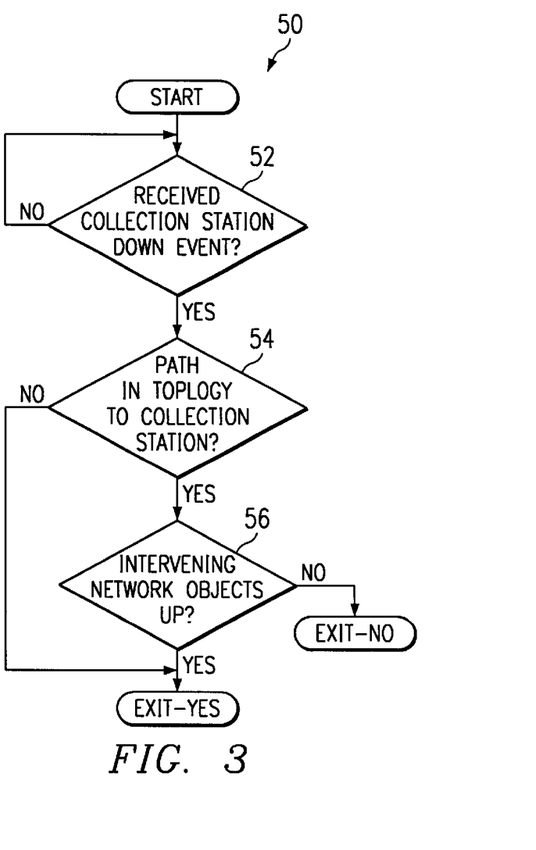
FIG. 3 illustrates the methodology of the present invention used to determine whether a collection station has become unreachable.

Whether the collection station 12 has become unreachable is determined by the methodology illustrated in FIG. 3. At Decision Block 52, the inquiry is whether the central control unit 14 has received an event over communication interface 20 from another process on the collection station which will determine if collection station 12 is unreachable. The event is normally sent after the collection station 12 has failed to respond to a predetermined number of polls, such as four polls, sent by a topology manager program of a topology database and the topology manager program therefore changes the status of the collection station to critical. If no such event is received by netmon, then the netmon program resident on the central control unit 14 simply continues to monitor the collection station 12 until such an event is received. If the central control unit 14 has received a collection station down event, then the flow continues to Decision Block 54. At Decision Block 54, the inquiry is whether a path to the collection station 12 is in the topology of the central control unit 14. If it is, the inquiry at Block 56 is whether any intervening network objects are operational. If intervening network objects are down, then the station will not failover. If the station is not reachable because of a network device then the devices on the other side of the network device would also not be reachable. Failing over would be a waste of resources in this case.

Referring back to FIG. 2, once it is known that a monitored collection station is down, then failover polling status of the collection station's objects by the central control unit must occur. The failover and release of the failover, once the collection station is again able to handle status polling, may be either manual or automatic. Manual failover and release of the manual failover, shown in Blocks 36 and 44, are optional as indicated by the dashed boxes of these blocks. Manual failover and release indicate that the user must actively cause the failover and release operations, as the netmon program does for automatic failover and release. If manual failover and release are decided upon, then Blocks 36 and 44 replace Blocks 34 and 42 of FIG. 2, the decision blocks that determine whether to continue polling.

Figure 4:
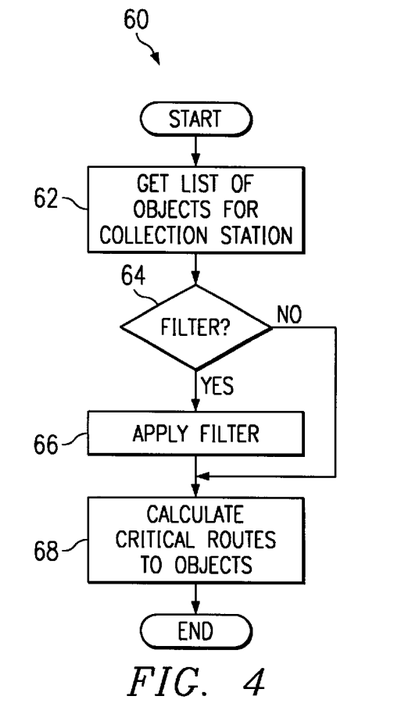
FIG. 4 illustrates the methodology of the present invention for loading the topology of a critical collection station.
Figure 5:
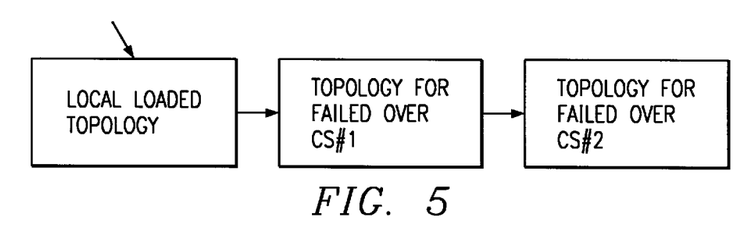
FIG. 5 illustrates a pointer to the topological information for a particular collection station, according to the present invention.
Figure 6:
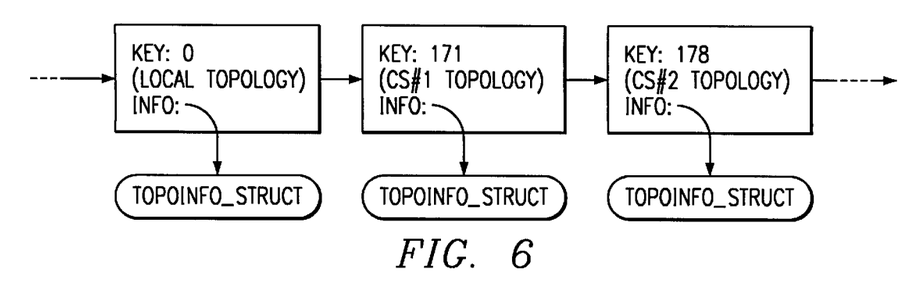
FIG. 6 illustrates that the topologies for one or more critical collection stations may be loaded onto the central control unit, according to the present invention.

The first step of the automatic failover operation is to load the topology of the down collection station 12 as illustrated in Block 38. Loading the topology of the critical collection station is illustrated in more detail in the flow 60 of FIG. 4. Upon receiving the collection station down event, netmon requests the topology for the collection station from the local topology datastore using any failover filter that has been specified by the user. As shown in Block 62, once netmon receives the collection station down event, it will request the list of the objects of the failed collection station that it is to poll from an application programming interface (API). This API will return the entire topology monitored by the critical collection station 12. netmon handles multiple loaded topologies in a linked list. The new loaded topology will not be merged with the current local loaded topology. In order to support multiple loaded topologies at the same time, the required data structure has a list of pointers to various topologies. As shown in FIG. 5, the topologies for one or more critical collection stations may be loaded onto the central control unit. Referring to FIG. 6, an implementation of FIG. 5, the key of the data structure is the station id, a locally assigned id number, and info is a pointer to the topological information for a particular collection station. For example, as shown in the figure, key=0 for the local topology being monitored by the central control unit 14, key=171 for the topology of a first critical collection station and key=172 for the topology of a second critical collection station.

The loaded topologies are stored, but netmon must determine which topologies to load at start-up. During a subsequent start-up of netmon, therefore, it will check the status for each of the collection stations of which it has knowledge. If any of the collection stations are down and the central control unit 14 has been configured to failover for the failed collection station(s) in that circumstance, then the central control unit 14 will failover these stations.

At Decision Block 64, the inquiry is whether the user has specified any filter through which the list of objects obtained as a result of Block 62 must be filtered. The user can specify a filter which allows the user to customize the objects that will be loaded when a failover occurs. The filter operates to filter out unspecified nodes and interfaces of the collection station objects; filters are applied on a per collection station basis. Since interfaces and the node to which they are attached are considered a unit, then if one interface or the nodes passes the filter than the entire node with all of its interfaces will pass the filter.

When netmon requests the collection station topology to load via the API, this filter is applied to the objects of the collection station before the data is returned to netmon. It is more efficient to filter objects before the topology is provided to netmon than after it has been provided. Only the status polling functionality and not the full responsibilities of the collection station is taken over by the central control unit. The failover filter also gives the user the ability to determine how much extra work netmon will have to perform by controlling the collection station topology information that is provided to it.

If such a failover filter has been specified, then the parameters of the filter must be applied at Block 66 to obtain the filtered list of objects. If no filter has been specified he flow continues directly to Block 68. At Block 68, the critical routes to the remaining objects to be polled must be calculated. Netmon calculates the critical route, if possible, for each of the nodes in the loaded topology in order to support the failover status polling.

Referring back to FIG. 2, netmon adds the filtered objects and the critical routings thereof to the status polling list of the central control unit in order to accomplish the failover polling of Block 40. The interfaces are added in such a manner as to avoid multiple polling of the same object, as discussed before. The status polling list is often referred to as a ping or IPXping list. The user, during the initial configuration of Block 32, determines whether the newly added objects will be polled at load time at Block 38 or at the time at which the critical collection station would have polled the objects. The user typically determines the frequency of polling; periodic polling, such as every five minutes, may be set by default. Netmon will send a station failover event to notify the user that status polling for the objects of the collection station 12 have begun on the central control unit 14. Polling of the objects of the critical collection station by the central control unit 14 continues until the collection station 12 is back up and ready to resume polling of its own objects. This is illustrated by Decision Block 42.

The placement of Block 42 after Block 40 should not be construed to imply that an inquiry as to whether to continue polling is only performed after all of the objects have been polled. It is understood that the critical collection station is monitored continuously so that whenever the collection station is again accessible the failover will be released, regardless of whether all objects have yet been polled or not. When the collection station 12 is back up again, then the failover is released—either manually at Block 44 or automatically at Block 46.

Figure 7:
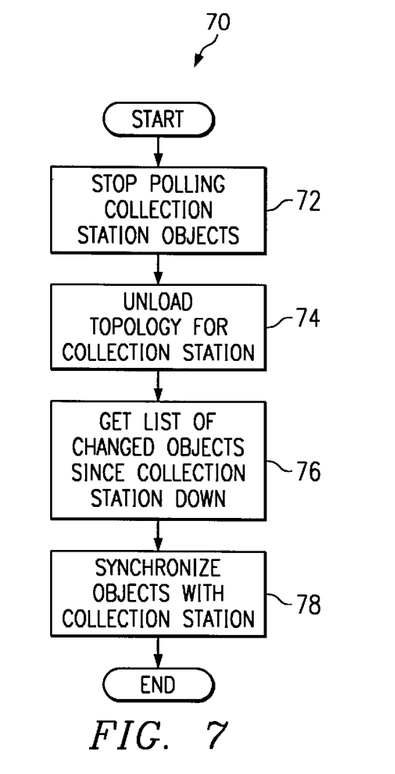
FIG. 7 illustrates the methodology for releasing the topology is associated with a collection station that has become accessible again, according to the present invention.

Automatic release of the failover from the central control unit 14 back to a normal status collection station is initiated when netmon receives an event that indicates that the collection station 12 is reachable and able to perform polling operations of its own objects. To this end, the topology manager program of the topology database changes the status of a collection station to normal and triggers a collection station normal event to be sent. This collection station normal event is received by the netmon program of the central control unit 14. If the collection station 12 had failed over and central control unit 14 had taken over polling operations for it, then the central control unit 14 stops polling of the collection station objects, as indicated in Block 72 of the flow 70 of FIG. 7. Next, at Block 74 netmon unloads or deletes the loaded topology of the collection station that had failed and the objects that had been added to the status polling list of the central control unit 14. Once the topology of the collection station has been unloaded, a list of objects that have changed status since the collection station went critical must be obtained at Block 76. These objects typically would have changed as a result of status polling by the central control unit 14. As shown at Block 78, this list of changed collection station objects is used to synchronize the status on the central control unit 14 and the collection station 12. Once the collection station regains normal status, the status of the objects according to the collection station 12 takes precedence over the status of the objects according to the central control unit 14. Therefore, the status of an object from the collection station 12 will take priority and overwrite the status for the same object stored in the central control unit 14 topology database. Once netmon has removed all references to the collection station, it sends a failover released message to the user to indicate that the central control unit 14 is no longer status polling for objects on the collection station 12.

Figure 8:
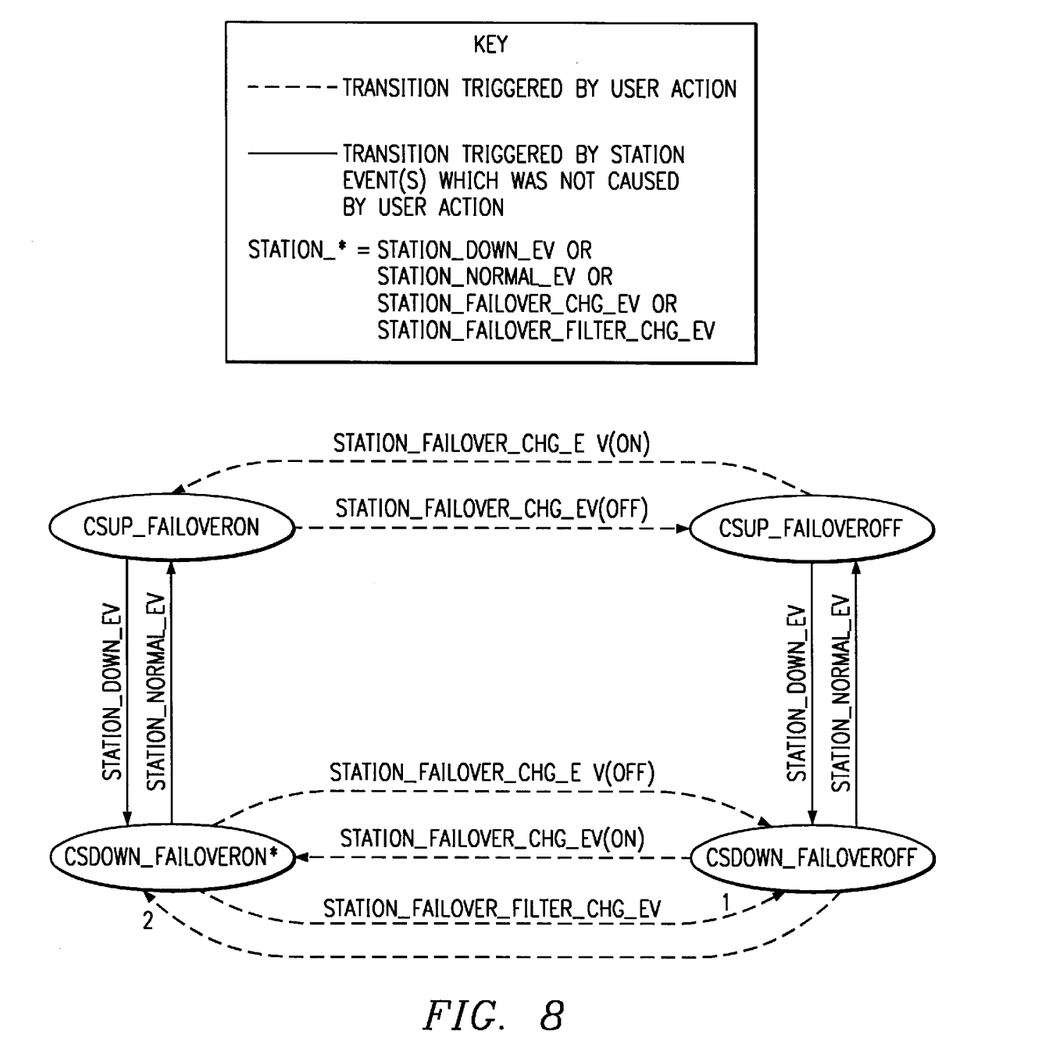
FIG. 8 is a state diagram that illustrates the operation of the present invention.

The operation of the present invention is further demonstrated by the state diagram of FIG. 8. STATION_FAILOVER_CHG_EV (On) is an event that indicates that when a collection station goes down, the central control unit is to takeover status polling for the failed collection station. STATION_FAILOVER_CHG_EV (Off) is an event that indicates that when a collection station goes down, the central control unit is not to takeover status polling. STATION_FAILOVER_FILTER_CHG_EV is an event that indicates that a filter is to filter the objects of the downed collection station prior to presenting the topology of the downed collected station to netmon of the central control unit; an existing topology can be reloaded using the filter. STATION_DOWN_EV is an event that indicates that a collection station has a critical status. STATION_NORMAL_EV is an event that indicates that a collection station has a normal status and is not down. As shown in the legend of FIG. 8, a dashed line indicates a transition that was triggered by a user action while a solid line indicates a transition that was triggered by a station event, such as a collection station or a central control unit event, and not by user intervention or action.

The present invention uses software to perform network status polling, as opposed to the prior practice of accomplishing fault tolerance through hardware.

While the invention has been particularly shown and described with reference to a preferred embodiment, it will be understood by those skilled in the art that various changes in form and detail may be made therein without departing from the spirit and scope of the invention.

What is claimed is:

1. A distributed computing environment, comprising:
   a collection station of one or more collection stations of the distributed computing environment that is responsible for status polling a plurality of objects; and
   a central control unit that automatically performs status polling of the plurality of objects when the collection station becomes temporarily inaccessible on the distributed computing environment and that releases polling of the plurality of objects back to the collection station if the collection station becomes accessible,
   wherein when the collection station and a second collection station of the one or more collection stations are both responsible for polling the plurality of objects, the plurality of objects are polled by both the central control unit and the second collection station while said collection station is inaccessible.

2. The environment of claim 1, wherein the central control unit is a management station.

3. The environment of claim 1, wherein a network monitor program of the central control unit that monitors the one or more collections stations of the distributed computing environment performs status polling of the plurality of objects while said collection station is inaccessible.

4. A distributed computing environment, comprising:
   a collection station of one or more collection stations of the distributed computing environment that is responsible for status polling a plurality of objects; and
   a central control unit that automatically performs status polling of the plurality of objects when the collection station becomes temporarily inaccessible on the distributed computing environment and that releases polling of the plurality of objects back to the collection station if the collection station becomes accessible, wherein when the collection station becomes inaccessible, the network monitor program receives a topology of the collection station, wherein the topology of the collection station is a list of the plurality of objects managed by the collection station and nodes and routings thereof;
   wherein when the collection station and a second collection station of the one or more collection stations are both responsible for polling the plurality of objects, the plurality of objects are polled by both the central control unit and the second collection station while said collection station is inaccessible;
   wherein a network monitor program of the central control unit that monitors the one or more collections stations of the distributed computing environment performs status polling of the plurality of objects while said collection station is inaccessible.

5. The environment of claim 4, wherein the list of the plurality of objects is determined by a filter.

6. A method of automatic status polling failover of objects in a distributed computing environment, comprising:
   a) defining an initial configuration of a central control unit and one or more collection stations of the distributed computing environment in which a user of the distributed computing environment specifies a polling configuration of the central control unit and the one or more collection stations;

b) determining whether a collection station of one or more collection stations is inaccessible;

c) if the collection station is inaccessible, loading a topology of the collection station to a network monitor program of a central control unit that monitors the one or more collection stations, wherein the topology is a list of a plurality of objects managed by the collection station and nodes and routings thereof;

d) automatically performing status polling of a plurality of objects of the topology of the collection station by the central control unit while said collection station is inaccessible; and e) monitoring the collection station and releasing the topology of the plurality of objects back to the collection station when the collection station is again accessible so that the collection station can resume status polling of the plurality of objects by the collection station.

7. The method of claim 6, wherein prior to determining whether the collection station is inaccessible, further comprising:

determining the list of the plurality of objects.

8. A method of automatic status polling failover of objects in a distributed computing environment, comprising:

a) defining an initial configuration of a central control unit and one or more collection stations of the distributed computing environment in which a user of the distributed computing environment specifies a polling configuration of the central control unit and the one or more collection stations;

b) determining the list of the plurality of objects, wherein determining the list of the plurality of objects is performed by a filter;

c) determining whether a collection station of one or more collection stations is inaccessible;

d) if the collection station is inaccessible, loading a topology of the collection station to a network monitor program of a central control unit that monitors the one or more collection stations, wherein the topology is a list of a plurality of objects managed by the collection station and nodes and routings thereof;

e) automatically performing status polling of a plurality of objects of the topology of the collection station by the central control unit while said collection station is inaccessible; and f) monitoring the collection station and releasing the topology of the plurality of objects back to the collection station when the collection station is again accessible so that the collection station can resume status polling of the plurality of objects by the collection station.

9. A method of automatic status polling failover of objects in a distributed computing environment, comprising:

a) defining an initial configuration of a central control unit and one or more collection stations of the distributed computing environment in which a user of the distributed computing environment specifies a polling configuration of the central control unit and the one or more collection stations;

b) determining whether a collection station of one or more collection stations is inaccessible, wherein determining whether the collection station of one or more collection stations is inaccessible comprises:

determining that the central control unit has received a collection station fail event that indicates that the collection station is inaccessible; and determining that the collection station fail event is in the topology of the collection station;

c) if the collection station is inaccessible, loading a topology of the collection station to a network monitor program of a central control unit that monitors the one or more collection stations, wherein the topology is a list of a plurality of objects managed by the collection station and nodes and routings thereof;

d) automatically performing status polling of a plurality of objects of the topology of the collection station by the central control unit while said collection station is inaccessible; and e) monitoring the collection station and releasing the topology of the plurality of objects back to the collection station when the collection station is again accessible so that the collection station can resume status polling of the plurality of objects by the collection station.

10. The method of claim 9, wherein the collection station fail event is received by the central control unit after the collection station has failed to respond to a predetermined number of polls sent by a topology manager program of a topology database to the collection station.

11. A method of automatic status polling failover of objects in a distributed computing environment, comprising:

a) defining an initial configuration of a central control unit and one or more collection stations of the distributed computing environment in which a user of the distributed computing environment specifies a polling configuration of the central control unit and the one or more collection stations;

b) determining whether a collection station of one or more collection stations is inaccessible;

c) if the collection station is inaccessible, loading a topology of the collection station to a network monitor program of a central control unit that monitors the one or more collection stations, wherein the topology is a list of a plurality of objects managed by the collection station and nodes and routines thereof, wherein loading the topology of the collection station comprises:

the network monitor program requesting a list of the plurality of objects managed by the collection station;

determining whether the user has specified a filter through which the list of the plurality of objects are to be filtered;

if the user has not specified the filter, calculating the plurality of routes of the plurality of objects and then providing the list of the plurality of objects and the routes of the plurality of objects to the network monitor program; and if the user has specified the filter, filtering the list of the plurality of objects to produce a filtered list of the plurality of objects, calculating the plurality of routes of the filtered list and then providing the filtered list of the plurality of objects and the routes of the objects to the network monitor program;

d) automatically performing status polling of a plurality of objects of the topology of the collection station by the central control unit while said collection station is inaccessible; and e) monitoring the collection station and releasing the topology of the plurality of objects back to the collection station when the collection station is again accessible so that the collection station can resume status polling of the plurality of objects by the collection station.

12. The method of claim 11, wherein the topology is provided to the network is monitor program from an application programming interface (API).

13. A method of automatic status polling failover of objects in a distributed computing environment, comprising:
   a) defining an initial configuration of a central control unit and one or more collection stations of the distributed computing environment in which a user of the distributed computing environment specifies a polling configuration of the central control unit and the one or more collection stations;
   b) determining whether a collection station of one or more collection stations is inaccessible;
   c) if the collection station is inaccessible, loading a topology of the collection station to a network monitor program of a central control unit that monitors the one or more collection stations, wherein the topology is a list of a plurality of objects managed by the collection station and nodes and routines thereof;
   d) automatically performing status polling of a plurality of objects of the topology of the collection station by the central control unit while said collection station is inaccessible;
   e) monitoring the collection station and releasing the topology of the plurality of objects back to the collection station when the collection station is again accessible so that the collection station can resume status polling of the plurality of objects by the collection station;
   f) determining whether a second collection station of the one or more collection stations is responsible for polling the plurality of objects; and
   g) if the second collection station is responsible for polling the plurality of objects, performing status polling of the plurality of objects by both the central control unit and the second collection station.

14. A method of automatic status polling failover of objects in a distributed computing environment, comprising:
   a) defining an initial configuration of a central control unit and one or more collection stations of the distributed computing environment in which a user of the distributed computing environment specifies a polling configuration of the central control unit and the one or more collection stations;
   b) determining whether a collection station of one or more collection stations is inaccessible;
   c) if the collection station is inaccessible, loading a topology of the collection station to a network monitor program of a central control unit that monitors the one or more collection stations, wherein the topology is a list of a plurality of objects managed by the collection station and nodes and routings thereof;
   d) automatically performing status polling of a plurality of objects of the topology of the collection station by the central control unit while said collection station is inaccessible; and
   e) monitoring the collection station and releasing the topology of the plurality of objects back to the collection station when the collection station is again accessible so that the collection station can resume status polling of the plurality of objects by the collection station, wherein releasing the topology of the plurality of objects back to the collection station occurs after the monitor network program receives a collection station normal event that indicates that the collection station is accessible on the distributed computing environment.

15. A method of automatic status polling failover of objects in a distributed computing environment, comprising:
   a) defining an initial configuration of a central control unit and one or more collection stations of the distributed computing environment in which a user of the distributed computing environment specifies a polling configuration of the central control unit and the one or more collection stations;
   b) determining whether a collection station of one or more collection stations is inaccessible;
   c) if the collection station is inaccessible, loading a topology of the collection station to a network monitor program of a central control unit that monitors the one or more collection stations, wherein the topology is a list of a plurality of objects managed by the collection station and nodes and routings thereof;
   d) automatically performing status polling of a plurality of objects of the topology of the collection station by the central control unit while said collection station is inaccessible;
   e) monitoring the collection station and releasing the topology of the plurality of objects back to the collection station when the collection station is again accessible so that the collection station can resume status polling of the plurality of objects by the collection station;
   f) unloading the topology of the collection station from the central control unit; and
   g) sending a status message to the user to indicate that the central control unit is no longer status polling the plurality of objects of the collection station.

* * * * *

UNITED STATES PATENT AND TRADEMARK OFFICE
CERTIFICATE OF CORRECTION

PATENT NO.      : 6,295,558 B1
DATED           : September 25, 2001
INVENTOR(S)     : Davis et al.

It is certified that error appears in the above-identified patent and that said Letters Patent is hereby corrected as shown below:

Title page, Item [54] and Column 1, line 2,
Title, delete "OR DEVICES" and insert therefor -- OF DEVICES --

Signed and Sealed this

Seventh Day of October, 2003

JAMES E. ROGAN
*Director of the United States Patent and Trademark Office*